United States Patent
Usui et al.

(10) Patent No.: US 9,416,845 B2
(45) Date of Patent: Aug. 16, 2016

(54) DAMPER WITH TORQUE LIMITER

(71) Applicant: YUTAKA GIKEN CO., LTD., Hamamatsu-Shi, Shizuoka (JP)

(72) Inventors: Ichiro Usui, Hamamatsu (JP); Takanori Makita, Hamamatsu (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 0 days.

(21) Appl. No.: 14/765,636

(22) PCT Filed: Jan. 30, 2014

(86) PCT No.: PCT/JP2014/052085
§ 371 (c)(1),
(2) Date: Aug. 4, 2015

(87) PCT Pub. No.: WO2014/123059
PCT Pub. Date: Aug. 14, 2014

(65) Prior Publication Data
US 2015/0377319 A1 Dec. 31, 2015

(30) Foreign Application Priority Data
Feb. 5, 2013 (JP) .................................. 2013-020818

(51) Int. Cl.
*F16F 15/10* (2006.01)
*F16F 15/139* (2006.01)
*F16D 7/02* (2006.01)
(Continued)

(52) U.S. Cl.
CPC .............. *F16F 15/1397* (2013.01); *F16D 3/12* (2013.01); *F16D 3/14* (2013.01); *F16D 7/02* (2013.01); *F16D 7/025* (2013.01); *F16F 15/133* (2013.01); *F16F 15/134* (2013.01); *F16F 15/139* (2013.01); *F16F 15/1392* (2013.01)

(58) Field of Classification Search
CPC . F16F 15/133; F16F 15/1392; F16F 13/1397; F16D 7/02
USPC .................................................. 464/46, 68.1
See application file for complete search history.

(56) References Cited

U.S. PATENT DOCUMENTS 4,724,719 A * 2/1988 Woerner ............ F16F 15/13484
6,923,725 B2 * 8/2005 Takeuchi .............. F16F 15/129
(Continued)

FOREIGN PATENT DOCUMENTS

CN 102472361 5/2012
JP 2003-013992 A 1/2003
(Continued)

*Primary Examiner* — Gregory Binda
(74) *Attorney, Agent, or Firm* — Carrier Blackman & Associates, P.C.; Joseph P. Carrier; Anne G. Sabourin

(57) ABSTRACT

A damper with a torque limiter is provided in which a torque limiter is formed from an annular limiter housing formed on a mass ring, a friction plate frictionally engaging with the limiter housing a pressure-applying plate that frictionally engages with the friction plate and that is linked to the mass ring, and a limiter spring urging the pressure-applying plate toward the friction plate side, a spring holder is formed from a pair of first and second holder plates that oppose each other to define a damper housing and that are joined to each other by a rivet, and the friction plate is formed integrally with the second holder plate. Thus, a rivet providing a link between a pair of holder plates forming a spring holder does not carry the burden of torque transmission, enabling the diameter of the rivet to be smaller and thereby reducing weight and cost.

2 Claims, 3 Drawing Sheets

(51) Int. Cl.
*F16F 15/134* (2006.01)
*F16D 3/12* (2006.01)
*F16D 3/14* (2006.01)
*F16F 15/133* (2006.01)

(56) References Cited

U.S. PATENT DOCUMENTS

| | | |
|---|---|---|
| 7,238,111 B2 | 7/2007 | Kintou et al. |
| 8,257,183 B2 | 9/2012 | Inoshita et al. |
| 8,282,494 B2 * | 10/2012 | Saeki .............. F16F 15/12366 464/46 |
| 8,439,762 B2 | 5/2013 | Takeshita et al. |
| 8,657,690 B2 | 2/2014 | Doman et al. |

FOREIGN PATENT DOCUMENTS

| | | |
|---|---|---|
| JP | 2003222191 A | 8/2003 |
| JP | 2010-236601 A | 10/2010 |
| JP | 2011-185359 A | 9/2011 |
| WO | 2011/024639 A1 | 3/2011 |

\* cited by examiner

DAMPER WITH TORQUE LIMITER

TECHNICAL FIELD

The present invention relates to improvement of a damper with a torque limiter in which a mass ring is linked to a drive plate linked to an input shaft, a spring holder is linked to the mass ring via a torque limiter, a driven plate linked to an output shaft is disposed within the spring holder, and a damper spring is disposed so as to straddle the spring holder and the driven plate, the damper spring being compressed by relative rotation of the spring holder and the driven plate.

BACKGROUND ART

Such a damper with a torque limiter is arranged so that when a variation in torque occurs between the input shaft and the output shaft, the torque variation is absorbed by virtue of compressive deformation of the damper spring, and when excessive torque acts between the input shaft and the output shaft, transmission of torque is blocked by slipping of the torque limiter; such a damper with a torque limiter is already known, as disclosed in Patent Document 1 below.

RELATED ART DOCUMENTS

Patent Documents

Patent Document 1: Japanese Patent Application Laid-open No. 2010-236601

SUMMARY OF THE INVENTION

Problems to be Solved by the Invention

In a conventional damper with a torque limiter, a spring holder is formed from a pair of mutually opposing holder plates; when these two holder plates are joined, a friction plate is added thereto, and the three are joined using a common rivet. Therefore, in such an arrangement, transmission of torque between the friction plate and the spring holder is mediated by the rivet, and since it is necessary for the rivet to have a strength that can withstand the transmission of torque, the diameter is inevitably increased, thus resulting in an increase in weight and cost.

The present invention has been accomplished in light of such circumstances, and it is an object thereof to provide a damper with a torque limiter in which a rivet providing a link between a pair of holder plates forming a spring holder does not carry the burden of torque transmission, thus enabling the diameter of the rivet to be made small and thereby enabling the weight and the cost to be reduced.

Means for Solving the Problems

In order to attain the above object, according to a first aspect of the present invention, there is provided a damper with a torque limiter in which a mass ring is linked to a drive plate linked to an input shaft, a spring holder is linked to the mass ring via a torque limiter, a driven plate linked to an output shaft is disposed within the spring holder, and a damper spring is disposed so as to straddle the spring holder and the driven plate, the damper spring being compressed by relative rotation of the spring holder and the driven plate, characterized in that the torque limiter is formed from an annular limiter housing that is formed on an inner peripheral side of the mass ring, a friction plate that has one side face frictionally engaging with one side face of the limiter housing, a pressure-applying plate that engages with the other side face of the friction plate and that is linked to the mass ring, and a limiter spring that is capable of urging the pressure-applying plate toward the friction plate side and generating a predetermined frictional torque between the friction plate and the mass ring and pressure-applying plate, the spring holder is formed from a pair of first and second holder plates that oppose each other so as to define a damper housing for housing the damper spring and the driven plate and that are joined to each other by a rivet, and the friction plate is formed integrally with the second holder plate. It should be noted here that the input shaft corresponds to a crankshaft 1 of an embodiment of the present invention, which will be described hereinafter.

Further, according to a second aspect of the present invention, in addition to the first aspect, a plurality of centering projections are formed on an outer peripheral face of the friction plate, the centering projections sliding on an inner peripheral face of the limiter housing so as to carry out centering of the friction plate with respect to the mass ring.

Furthermore, according to a third aspect of the present invention, in addition to the first or second aspect, the friction plate and the second holder plate are formed from a steel plate having a plate thickness that is smaller than that of the first holder plate, and a plurality of annular bent parts are formed on the second holder plate.

Effects of the Invention

In accordance with the first aspect of the present invention, since the torque limiter is formed from the annular limiter housing that is formed on the inner peripheral side of the mass ring, the friction plate that has one side face frictionally engaging with one side face of the limiter housing, the pressure-applying plate that frictionally engages with the other side face of the friction plate and that is linked to the mass ring, and the limiter spring that is capable of urging the pressure-applying plate toward the friction plate side and generating a predetermined frictional torque between the friction plate and the mass ring and pressure-applying plate, the spring holder is formed from the pair of first and second holder plates that oppose each other so as to define the damper housing housing the damper spring and the driven plate and that are joined to each other by means of the rivet, and the friction plate is formed integrally with the second holder plate, a torque that acts from the mass ring on the friction plate of the torque limiter is transmitted directly to the second holder plate and does not act on the rivet. Therefore, it is possible to join the first and second holder plates by means of the rivet, which has a relatively small diameter, thereby contributing to lightening of the weight and a reduction in cost.

In accordance with the second aspect of the present invention, since the plurality of centering projections, which slide on the inner peripheral face of the limiter housing so as to carry out centering of the friction plate with respect to the mass ring, are formed on the outer peripheral face of the friction plate, the friction plate, the spring holder, and the driven plate are individually centered with respect to the mass ring, and when the drive plate joined to the input shaft is joined to the mass ring during assembly, the input shaft and the hub of the driven plate are coaxially aligned, thus making it possible to easily and appropriately spline fit the output shaft, which is positioned coaxially with the input shaft, into the hub of the driven plate, and thereby improving the ease of assembly.

In accordance with the third aspect of the present invention, since the friction plate and the second holder plate are formed from a steel plate having a plate thickness that is smaller than that of the first holder plate, it is possible to decrease the axial dimension of the torque limiter, thus making the torque limiter compact. Moreover, although the second holder plate has a small plate thickness, it has the plurality of annular bent parts by which it is reinforced effectively, thus enabling a sufficient strength to be imparted to the spring holder in cooperation with the first holder plate, which has a large plate thickness, and this can also contribute to lightening of the weight of the spring holder.

EXPLANATION OF REFERENCE NUMERALS AND SYMBOLS

Figure 1:
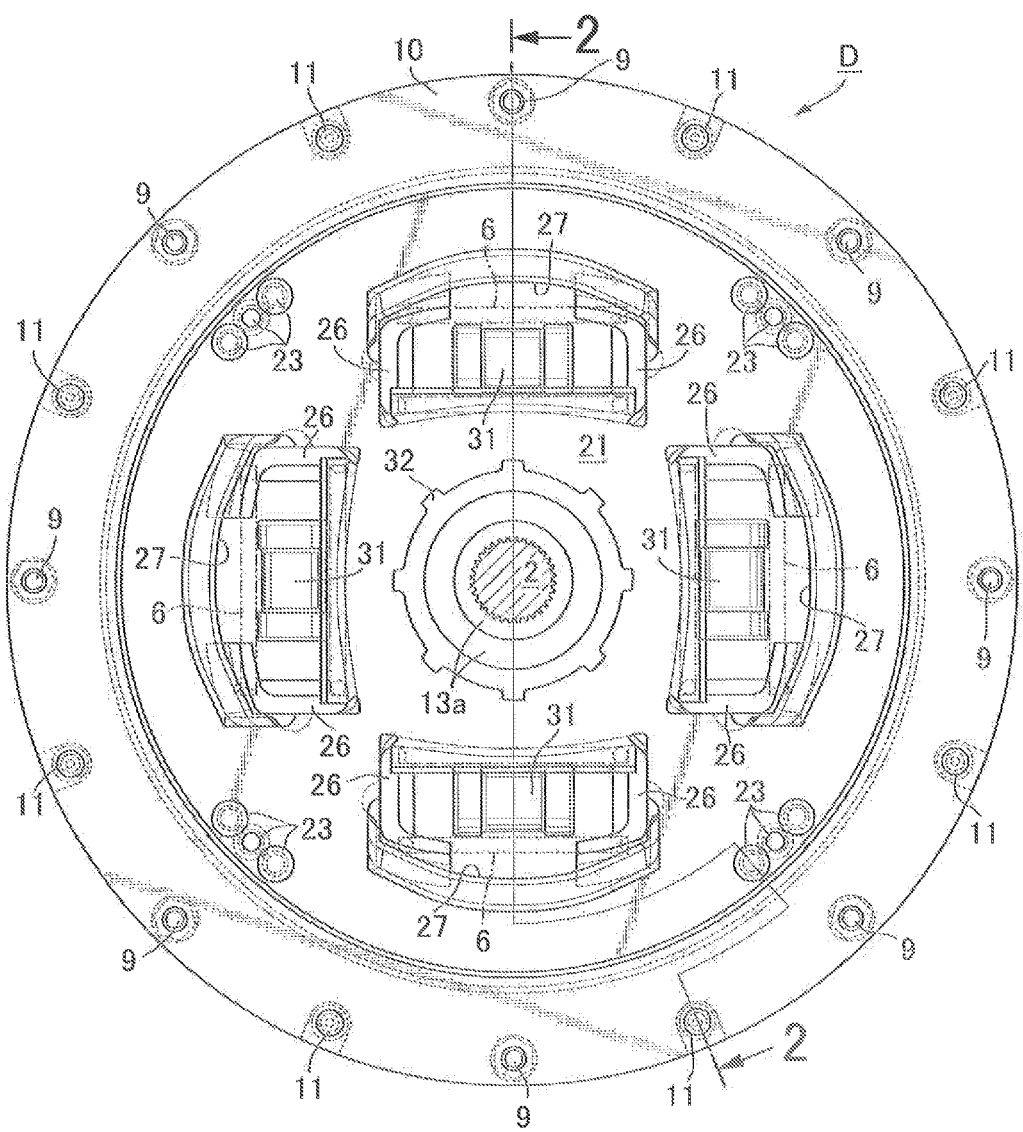
FIG. 1 is a front view relating to an embodiment of the present invention (first embodiment).

D Damper with torque limiter
1 Input shaft (crankshaft)
2 Output shaft
3 Mass ring
4 Torque limiter
5 Spring holder
6 Damper spring
7 Drive plate
12 Limiter housing
13 Driven plate
15 Friction plate
16 Pressure-applying plate
17 Limiter spring
21 First holder plate
22 Second holder plate
23 Rivet
24 Damper housing
36 Centering projection

MODES FOR CARRYING OUT THE INVENTION

An embodiment of the present invention is explained below by reference to the attached drawings.

First Embodiment

Figure 2:
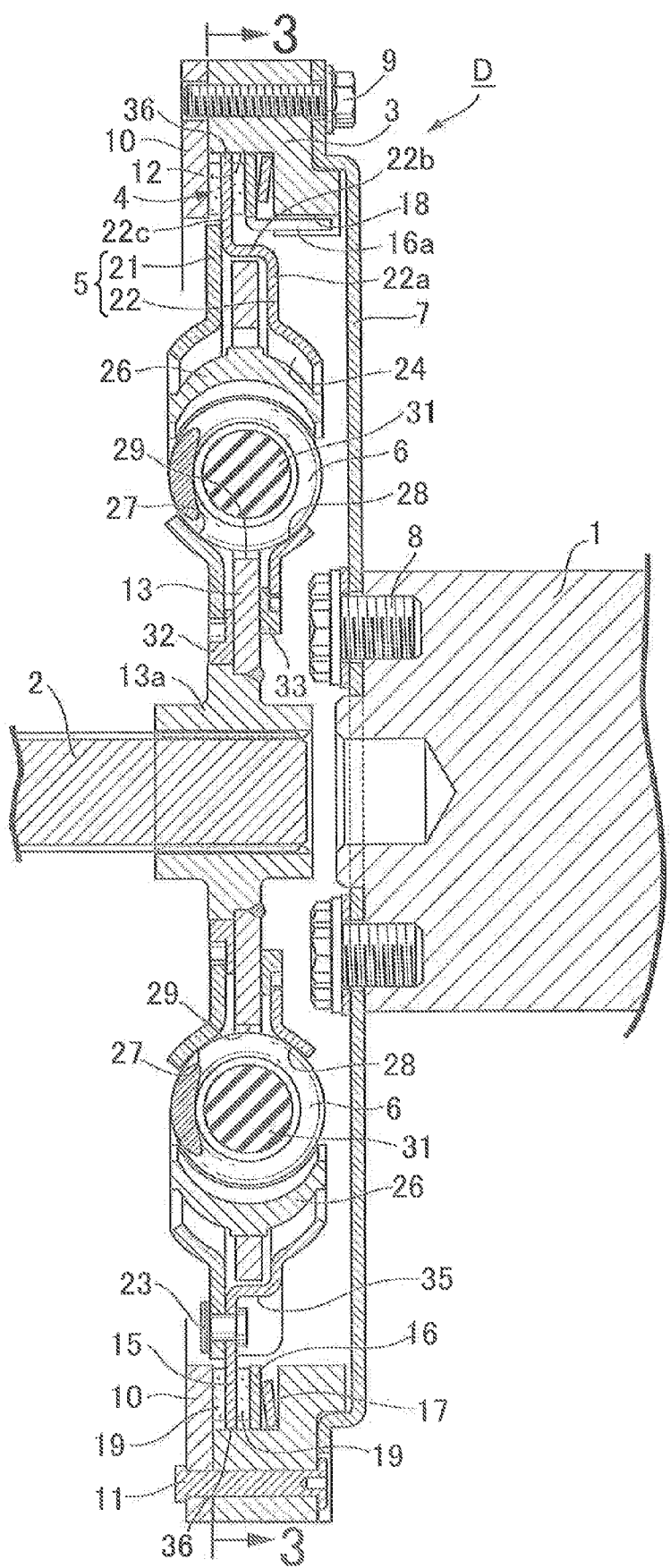
FIG. 2 is a sectional view along line 2-2 in FIG. 1 (first embodiment).
Figure 3:
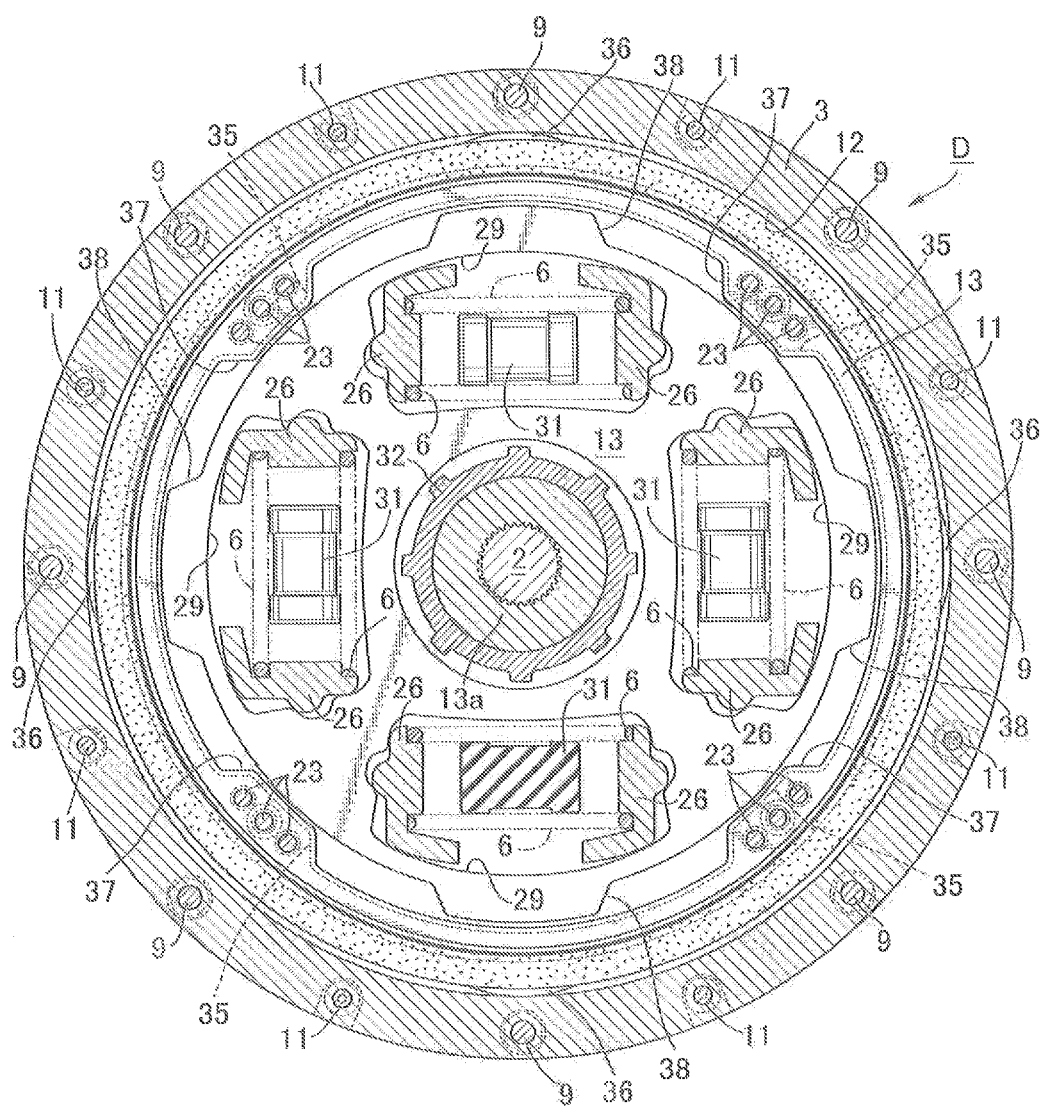
FIG. 3 is a sectional view along line 3-3 in FIG. 2 (first embodiment).

In FIG. 1 to FIG. 3, the power of a crankshaft 1 of an engine is transmitted to an output shaft 2, which is connected to a clutch or a transmission, via a damper D with a torque limiter 4 of the present invention.

The damper D 4 includes a mass ring 3, a torque limiter 4, a spring holder 5, a plurality of damper springs 6, and a driven plate 13.

A drive plate 7 is secured to one side face of the mass ring 3 by means of a bolt 9, the drive plate 7 being joined to the crankshaft 1 by means of a bolt 8. A pressure-receiving plate 10 is secured to the other side face of the mass ring 3 by means of a rivet 11, an annular limiter housing 12 is defined between the pressure-receiving plate 10 and the mass ring 3, the limiter housing 12 opening on the inner peripheral side of the mass ring 3, and the torque limiter 4 is disposed in the limiter housing 12.

The torque limiter 4 is formed from a friction plate 15 that is rotatably and slidably fitted into the limiter housing 12 and that is adjacent to the pressure-receiving plate 10, a pressure-applying plate 16 that is disposed so as to sandwich the friction plate 15 in cooperation with the pressure-receiving plate 10, and a plate-shaped limiter spring 17 that is provided in a compressed state in the limiter housing 12 in order to urge the pressure-applying plate 16 toward the friction plate 15 side with a predetermined set load. The pressure-applying plate 16 includes a transmission claw 16a at the inner peripheral edge, and this transmission claw 16a engages with a cutout 18 on an inner peripheral face of the mass ring 3 to thus link the pressure-applying plate 16 to the mass ring 3 in the rotational direction. Adhered to left and right faces of the friction plate 15 are linings 19 and 19 that frictionally engage with the pressure-receiving plate 10 and the pressure-applying plate 16.

The spring holder 5 is formed from a pair of left and right first and second holder plates 21 and 22, which oppose each other, the two holder plates 21 and 22 being joined to each other by means of a rivet 23 on the outer peripheral side and forming an annular damper housing 24 on the inner peripheral side. This damper housing 24 houses a plurality of peripherally-arranged damper springs 6, which are coil springs, pairs of retainers 26 and 26 opposing each other and supporting opposite ends of the respective damper springs 6, and the driven plate 13, the driven plate 13 including in a central part a hub 13a spline joined to the output shaft 2.

The first and second holder plates 21 and 22 are provided in the sliding direction with a plurality of sets of outside guide holes 27 and 28 arranged in the axial direction as pairs, the driven plate 13 is provided with an inside guide hole 29 disposed between the outside guide holes 27 and 28 of each set, and the pair of retainers 26 and 26 are slidably fitted so as to straddle the axially-arranged outside guide holes 27 and 28 and inside guide hole 29.

Housed within the damper spring 6 provided in a compressed state between each pair of retainers 26 and 26 is a secondary damper spring 31, made of rubber, which is compressed by means of the two retainers 26 and 26 when the damper spring 6 is compressively deformed by a predetermined amount.

Furthermore, first and second positioning rings 32 and 33 in sliding contact with opposite side faces of the driven plate 13 are spline joined to the inner peripheral end of each of the holder plates 21 and 22, the first positioning ring 32 being rotatably fitted around an outer peripheral face of the hub 13a. A lining may be adhered to faces of the first and second positioning rings 32 and 33 that are in sliding contact with the driven plate 13.

As shown in FIG. 2, the first and second holder plates 21 and 22 are both made of steel plate, but the second holder plate 22 has a smaller plate thickness than that of the first holder plate 21 and includes a first side wall 22a covering one side face of the driven plate 13 on the outer peripheral side, a peripheral wall 22b bending in the axial direction from the outer peripheral end of the first side wall 22a and covering an outer peripheral face of the driven plate 13, and a second side wall 22c bending in the radial direction from the extremity of the peripheral wall 22b and being superimposed on the first holder plate 21; a plurality of recessed parts 35, which are radially inwardly recessed, are formed in the peripheral wall 22b, and the second side wall 22c and the first holder plate 21 are joined by means of the rivet 23 in these recessed parts 35.

The second side wall 22c extends further in the radially outward direction, and the extending part forms the friction plate 15. That is, the friction plate 15 and the second holder plate 22 are formed integrally from the same steel plate.

A plurality of centering projections 36, which rotatably and axially slidably engage with an inner peripheral face of the limiter housing 12, are formed integrally with an outer peripheral face of the friction plate 15 so as to be arranged in the peripheral direction, thereby allowing each of the friction plate 15, the spring holder 5, which is integral with the friction plate 15, and the hub 13a, which is fitted into the first holder plate 21 via the first positioning ring 32, to be centered with respect to the mass ring 3.

The recessed part 35 projects on the damper housing 24 side as a drive side stopper projection 37, and a driven side stopper projection 38 is formed on the outer periphery of the driven plate 13, the driven side stopper projection 38 opposing the drive side stopper projection 37 across a predetermined distance in the peripheral direction.

The operation of this embodiment is now explained.

The power of the crankshaft 1 of the engine is transmitted to the output shaft 2 via, in sequence, the drive plate 7, the mass ring 3, the torque limiter 4 (the pressure-receiving plate 10, the pressure-applying plate 16, the friction plate 15), the spring holder 5, one retainer 26, the damper spring 6, the other retainer 26, and the driven plate 13. In this process, when a variation in torque occurs due to variation in output of the engine or variation in the load on the output shaft 2 side, the spring holder 5 and the driven plate 13 rotate relative to each other, the outside guide holes 27 and 28 of the spring holder 5 and the inside guide hole 29 of the driven plate 13 are displaced from each other, and each damper spring 6 is subjected to compressive deformation from the pair of retainers 26 and 26 supporting opposite ends of the damper spring 6, thus absorbing the torque variation.

When the damper spring 6 is compressed by a predetermined value or greater due to an increase in the torque variation, this time the secondary damper spring 31 on the inside of the damper spring 6 is compressed between the retainers 26 and 26, thus absorbing the increased torque variation.

When relative rotation between the spring holder 5 and the driven plate 13 reaches a predetermined angle, the drive side stopper projection 37 of the spring holder 5 abuts against the driven side stopper projection 38 of the driven plate 13, the relative rotation is stopped, and the crankshaft 1 and the output shaft 2 rotate as a unit.

Subsequently, when an excessive torque is applied between the crankshaft 1 and the output shaft 2, in the torque limiter 4 slip occurs between the friction plate 15 and the pressure-receiving plate 10 and pressure-applying plate 16, and transmission between the crankshaft 1 and the output shaft 2 is cut off, that is, relative rotation is allowed, thereby avoiding damage to the engine or the transmission device.

Since the first and second holder plates 21 and 22 forming the spring holder 5 are joined by means of the rivet 23, and the second holder plate 22 is formed integrally with the friction plate 15 of the torque limiter 4, the torque applied from the mass ring 3 to the friction plate 15 via the pressure-receiving plate 10 and the pressure-applying plate 16 is transmitted directly to the second holder plate 22 and does not act on the rivet 23. Therefore, it is possible to join the first and second holder plates 21 and 22 by means of the rivet 23, which has a relatively small diameter, thus contributing to lightening of the weight and a reduction in cost.

Furthermore, since the friction plate 15 and the second holder plate 22 are formed from a steel plate that has a smaller plate thickness than that of the first holder plate 21, the axial dimension of the torque limiter 4 is reduced, thus contributing to making compact the torque limiter 4, and consequently the mass ring 3 housing same.

Moreover, although the second holder plate 22 has a small plate thickness, it has the first and second side walls 22a and 22c and the peripheral wall 22b, that have a plurality of annular bent parts and it is reinforced effectively thereby, and this can impart sufficient strength to the spring holder 5 in cooperation with the first holder plate 21, which has a large plate thickness, thus contributing to lightening of the weight of the spring holder 5.

Furthermore, since, due to the plurality of centering projections 36 rotatably and axially slidably engaging with the inner peripheral face of the limiter housing 12 being formed integrally with the outer peripheral face of the friction plate 15 so as to be arranged in the peripheral direction, the friction plate 15, the spring holder 5, and the hub 13a of the driven plate 13 are each centered with respect to the mass ring 3, when the drive plate 7 joined to the crankshaft 1 is joined to the mass ring 3 during assembly, the crankshaft 1 and the hub 13a are coaxially aligned; therefore, the output shaft 2, which is positioned coaxially with the crankshaft 1, can easily and appropriately be spline fitted into the hub 13a, thereby improving the ease of assembly.

The present invention is not limited to the above embodiment and may be modified in a variety of ways as long as the modifications do not depart from the spirit and scope thereof.

The invention claimed is:

1. A damper with a torque limiter in which a mass ring is linked to a drive plate linked to an input shaft, a spring holder is linked to the mass ring via a torque limiter, a driven plate linked to an output shaft is disposed within the spring holder, and a damper spring is disposed so as to straddle the spring holder and the driven plate, the damper spring being compressed by relative rotation of the spring holder and the driven plate, wherein the torque limiter is formed from an annular limiter housing that is formed on an inner peripheral side of the mass ring, a friction plate that has one side face frictionally engaging with one side face of the limiter housing, a pressure-applying plate that engages with the other side face of the friction plate and that is linked to the mass ring, and a limiter spring that is capable of urging the pressure-applying plate toward the friction plate side and generating a predetermined frictional torque between the friction plate and the mass ring and pressure-applying plate, wherein a plurality of centering projections are formed on an outer peripheral face of the friction plate, the centering projections sliding on an inner peripheral face of the limiter housing so as to carry out centering of the friction plate with respect to the mass ring, the spring holder is formed from a pair of first and second holder plates that oppose each other so as to define a damper housing for housing the damper spring and the driven plate and that are joined to each other by a rivet, and the friction plate is formed integrally with the second holder plate.

2. The damper with a torque limiter according to claim 1, wherein the friction plate and the second holder plate are formed from a steel plate having a plate thickness that is smaller than that of the first holder plate, and a plurality of annular bent parts are formed on the second holder plate.

* * * * *